United States Patent
Lee et al.

(10) Patent No.: US 6,650,467 B2
(45) Date of Patent: Nov. 18, 2003

(54) ERBIUM-DOPED OPTICAL FIBER AMPLIFIER USING INPUT OPTICAL SIGNAL FILTERING

(75) Inventors: Jyung Chan Lee, Daejeon (KR); Jong Hyun Lee, Daejeon (KR); Moo Jung Chu, Daejeon (KR); Hee Sang Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 10/112,796

(22) Filed: Mar. 28, 2002

(65) Prior Publication Data

US 2003/0095325 A1 May 22, 2003

(30) Foreign Application Priority Data

Nov. 22, 2001 (KR) .................................. 2001-0073039

(51) Int. Cl.[7] ............................................... H01S 3/00
(52) U.S. Cl. .............................. 359/337.4; 359/341.4
(58) Field of Search ........................ 359/341.4, 341.41, 359/341.1, 337.4

(56) References Cited

U.S. PATENT DOCUMENTS

| | | | |
|---|---|---|---|
| 5,900,968 A | 5/1999 | Srivastava et al. | |
| 5,991,068 A | 11/1999 | Massicott et al. | |
| 6,055,092 A | 4/2000 | Sugaya et al. | |
| 6,175,436 B1 | 1/2001 | Jacket | |
| 6,215,584 B1 | 4/2001 | Yang et al. | |
| 6,359,727 B1 * | 3/2002 | Nakazato | 359/337.4 |
| 2002/0186460 A1 * | 12/2002 | Lelic | 359/341.4 |

FOREIGN PATENT DOCUMENTS

JP 410326930 A * 12/1998

OTHER PUBLICATIONS

Gain–shifted EDFA with all–optical automatic gain control by M. Artiglia et al.

Out of band electronic gain clamping for a variable gain and output power EDFA with low dynamic gain tilt by N.E. Jolley et al.

Dynamic performance of the all–optical gain–controlled EDFA cascade in multiwavelength optical networks by Sang Kim et al.

Low power transient in multichannel equalised and stabilised gain amplifier using passive gain control by B. Landousies et al.

* cited by examiner

*Primary Examiner*—Mark Hellner
(74) *Attorney, Agent, or Firm*—Blakely, Sokoloff, Taylor & Zafman

(57) ABSTRACT

Disclosed herein is an Erbium-Doped Fiber Amplifier (EDFA) used in a WDM (Wavelength Division Multiplexing) transmission system. In accordance with the present invention, a variation of the intensity of the output optical signal in the optical fiber amplifier, which results from an gain imbalance due to different wavelength distribution caused by the gain inhomogeneity characteristics, can be prevented by examining the laser diode sensitive to the gain inhomogeneity characteristics in the erbium-doped optical fiber amplifier, constructing the filter having spectrum characteristics capable of suppressing the gain imbalance of the optical signal outputted from the optical fiber amplifier, and driving the sensitive laser diode using the electrical signal obtained by branching some of the input optical signal and passing the branched optical signal through the filter and driving other laser diodes with a constant voltage value.

6 Claims, 8 Drawing Sheets

ERBIUM-DOPED OPTICAL FIBER AMPLIFIER USING INPUT OPTICAL SIGNAL FILTERING

BACKGROUND OF THE INVENTION

1. Field of the Invention

The present invention relates to an erbium-doped fiber amplifier used in a wavelength division multiplexing transmission system, and more particularly to an optical fiber amplifier, which is capable of controlling its gain to maintain the intensity of an output optical signal constant by driving a laser diode with a signal obtained by use of input optical signal filtering.

2. Description of the Prior Art

Wavelength Division Multiplexing (WDM) is a method for transmitting a plurality of optical signals of different wavelengths via a single optical fiber. Since the WDM uses the different wavelengths of optical signals simultaneously when the optical signals are transmitted, a wide bandwidth provided by the optical fiber can be effectively utilized. Therefore, this method is being popularized as next generation optical transmission technology.

An erbium-doped fiber amplifier is a kind of amplifier used in a WDM transmission system. The erbium-doped fiber amplifier is manufactured by doping special material called erbium into the fiber. When erbium is pumped by a laser, a weak optical signal can be amplified by energy released when excited erbium ions return to their original energy level.

Now, a general erbium-doped fiber amplifier will be described with reference to the accompanying drawings.

FIG. 1 is a view showing a configuration of a general erbium-doped fiber amplifier.

Referring to FIG. 1, a first amplification stage comprises an erbium-doped fiber 123, optical couplers 121 and 122 connected to the front and rear of the fiber 123, and laser diodes 124 and 125 supplying excitation light, i.e., laser light for the optical couplers 121 and 122. Similarly, a second amplification stage comprises an erbium-doped fiber 153, optical couplers 151 and 152 connected to the front and rear of the fiber 153, and laser diodes 154 and 155 supplying excitation light for the optical couplers 151 and 152. A gain equalization filter 13 and an optical attenuator 14 are sequentially connected between the first and second amplification stages and a laser diode controller 16 produces a driving voltage required for each of laser diodes 124, 125, 154 and 155. The optical couplers 121 and 151 are forward IWDM (Isolation and Wavelength Division Multiplexing) optical couplers and the optical couplers 122 and 152 are backward IWDM optical couplers. Here, the term "forward" means propagated in the same direction as an input optical signal, and the term "backward" means propagated in the opposite direction as an input optical signal.

In an amplification process in the first amplification stage, each of laser diodes 124 and 125 emits predetermined excitation light by the application of driving voltage supplied from the laser diode controller 16, and the excitation light is inputted to the erbium-doped fiber 123 by each of the optical couplers 121 and 122. The excitation light excites erbium ions included in the erbium-doped fiber 123. An optical signal inputted through an input port 11 and the optical coupler 121 can be amplified by energy released when erbium ions excited by the excitation light return to their original energy level. Such amplification is also achieved in the second amplification stage, and a resultant amplified optical signal is provided to the outside via an output port.

The gain equalization filter 13 located between the first and second amplification stages is for maintaining a balance of total gain by extracting a smooth portion of gain of the optical signal amplified in the first and second amplification stages. The optical attenuator 14 optimizes the optical signal by adjusting the intensity of the optical signal inputted into the second amplification stage.

In the above WDM transmission system, the number of channels of the optical signals is varied by capacity variation of the transmission network, errors of transmission channels, and any attachment and detachment of parts due to reconstruction of the transmission network. When the number of channels of the optical signals in use is varied, surviving channels in operation, i.e., remaining optical channels, move to an unwanted state through a transient state according to the characteristics of the erbium-doped fiber used as gain medium in the fiber amplifier, so the instantaneous change of gain and output power occurs, thus causing errors in optical transmission service.

Generally, since the fiber amplifier is constructed by connecting several amplification stages in series, though each of the amplification stages has a small variation of output, significant errors occur when the optical signal passes through the amplification stages in an optical transmission line. Therefore, there is a need to provide a gain control method for controlling the variation of output to be suppressed in a shorter time.

Generally, the erbium-doped fiber has gain inhomogeneity characteristics and cross gain saturation characteristics. The gain inhomogeneity characteristics mean a variation of gain of the surviving channels generated when the wavelength of the surviving channels having constant gain is varied. Gain in the erbium-doped fiber is shared by various optical channels, each having a constant gain value. The cross gain saturation characteristics mean equal distribution between the remaining optical channels generated when some of various optical channels are extinguished.

Therefore, since gain becomes varied according to wavelengths of the surviving channels and their distribution condition due to the gain inhomogeneity characteristics and the cross gain saturation characteristics of the erbium-doped fiber, there is a need to provide a gain control method for compensating for an output imbalance for each channel.

The gain control method of the fiber amplifier includes several methods that are described below.

A first method is to control the gain of the fiber amplifier by detecting input optical signals and adjusting excitation light such that it has a proper level of intensity.

However, although the above method is highest advantageous in terms of costs and operation, it has a problem that a range of control is widened in proportion to the number of channels used in optical transmission and it is required to provide a high speed excitation light control circuit having a higher response speed as the number of fiber amplifiers is increased in a system for remote transmission.

A second method is to control the gain of the fiber amplifier by adjusting the population inversion of the fiber amplifier by operating additional channels having wavelength bands different from those of multi-channel in operation. However, in this case, there is a problem that the additional channels require a high maximum output as the number of channels is increased, and a noise due to a nonlinear phenomenon occurs in the multi-channel optical signal in operation.

A third method is to control the gain of the fiber amplifier optically by inducing a laser emission through an optical feedback of some light outside the wavelength band of the multi-channel optical signals in operation so that the population inversion of the fiber amplifier is maintained. According to this method, the intensity of the fed-back laser-emitted light exhibits a damping oscillation in a transient variation state due to a variation of the intensity of the input optical signals. This damping oscillation is a phenomenon produced by an instantaneous perturbation of the population inversion in equilibrium if the upper-level lifetime of the erbium ions serving as a gain medium for the laser emission is longer than the lifetime of photons in a resonator. If this phenomenon is not removed or controlled to be less than a proper level, there occurs a problem that the surviving channels are badly affected. In addition, since this method requires a complicated circuit design in order to maintain the population inversion, there is a problem that high speed response characteristics can be not obtained.

Additionally, as a prior art for accomplishing an automatic gain control and an automatic light intensity control in the erbium-doped amplifier, disclosed is U.S. Pat. No. 6,055,092, issued on Jun. 25, 2000, entitled "Multi-wavelength light amplifier". This patent proposes a two-stage amplification construction, each amplification stage performing a function of the automatic gain control by branching some of input and output optical signals and a function of the automatic light intensity control through an optical attenuator provided between the amplification stages after branching and detecting some of output of the second amplification stage. However, this patent does not provide a gain control method considering gain inhomogeneity characteristics peculiar to the erbium-doped fiber.

As another gain control method of the erbium-doped fiber amplifier, there is a method for re-circulating some of output so that a constant population inversion is maintained in the erbium-doped fiber, which is described in detail in "Gain-shifted EDFA with all-optical automatic gain control", by M. Artiglia et al, ECOC '98, pp 293–294, 1998. However, this paper proposes only performing a gain control by re-circulating some light, and, therefore, is not a gain control method considering the gain inhomogeneity characteristics of the erbium-doped fiber in an excitation light control method.

In other words, by any of the above-described prior art methods, the problems of gain imbalance between the multi-channel optical signals and the intensity difference of light due to the gain inhomogeneity characteristics and cross gain saturation characteristics of erbium-doped fiber could not be overcome.

SUMMARY OF THE INVENTION

Accordingly, the present invention has been made keeping in mind the above problems occurring in the prior art, and an object of the present invention is to provide an erbium-doped fiber amplifier capable of controlling its gain so that the intensity of light of surviving channels outputted from the fiber amplifier is constantly maintained in a shorter time by compensating for gain inhomogeneity characteristics through a control of a laser diode based on a signal obtained using an input optical signal filtering when a gain control of an excitation light control system is applied.

In order to accomplish the above object, the present invention provides an erbium-doped optical fiber amplifier using input optical signal filtering, comprising: a first amplification stage for receiving an input optical signal and forward and backward excitation light, and amplifying the input optical signal using energy released when erbium ions excited by the excitation light return to their original energy level; a pre-processing means for performing a gain equalization process and a light intensity attenuating process for the signal amplified in the first amplification stage; a second amplification stage for receiving the optical signal processed in the pre-processing means and the forward and backward excitation light and performing a second amplification operation; a plurality of laser diodes for generating the forward and backward excitation light and providing it to the first and second amplification stages, respectively; an input optical signal detector for branching and receiving some of the input optical signal, separating the received optical signal into two signals having a ratio of 50:50, and photo-electrically converting a first one of the separated optical signals by performing a filtering process for compensating for the gain inhomogeneity characteristics of the fiber, and a second one without any filtering; and a laser diode controller for generating forward diode control voltage of the first amplification stage using the filtered signal of the electrical signals provided by the input optical signal detector and generating other laser diode control voltage using the signal that is not filtered.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
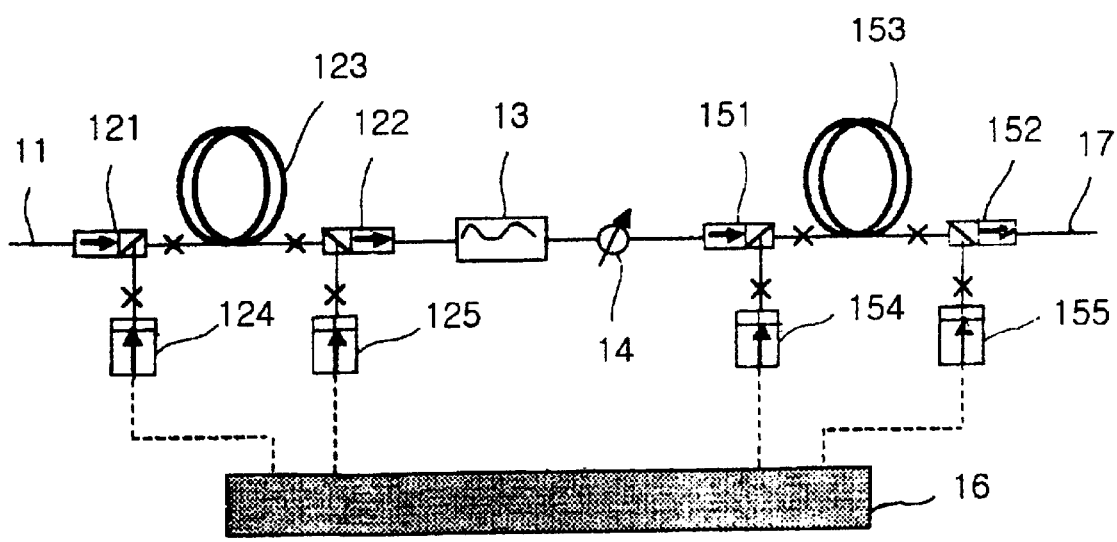
FIG. 1 is a view showing a configuration of a general erbium-doped optical fiber amplifier.

Reference now should be made to the drawings, in which the same reference numerals are used throughout the different drawings to designate the same or similar components.

Hereinafter, a preferred embodiment of the present invention is described in detail with reference to the accompanying drawings.

Prior to a discussion on an optical fiber amplifier of the present invention, the inventors examined proper control voltage required for a gain control of each amplification stage in every number of channels for a long wavelength gain band (1570–1605 nm) and a short wavelength gain band (1530–1565 nm) in the general erbium-doped optical fiber amplifier shown in FIG. 1.

Figure 2:
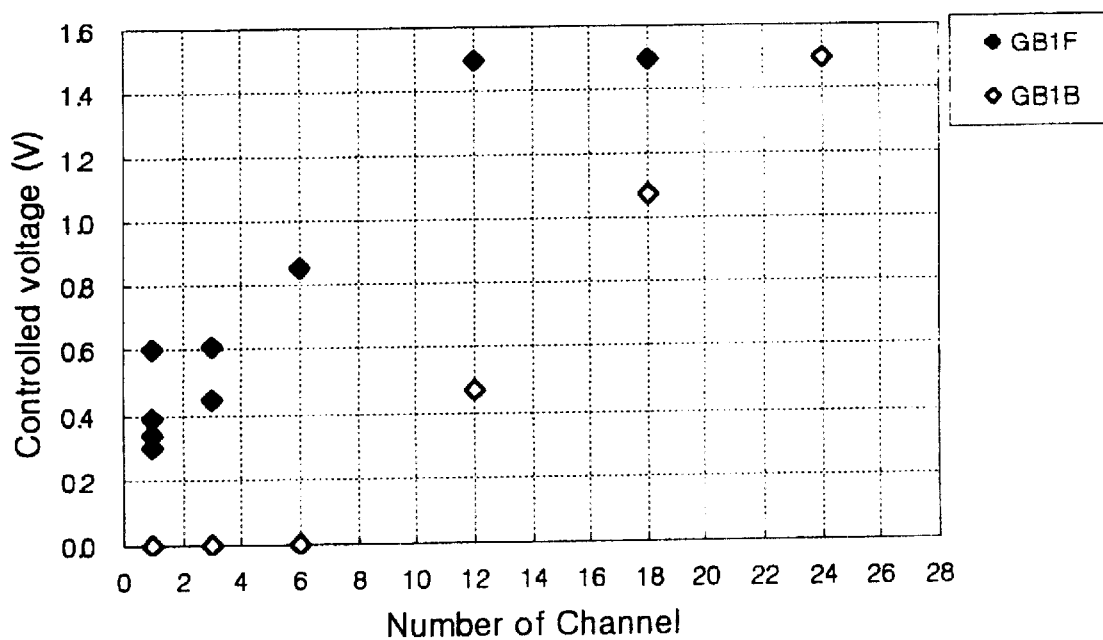
FIG. 2 is a graph showing a relationship between the number of channels of an input optical signal and a laser diode control voltage of a first amplification stage when the optical fiber amplifier of FIG. 1 is used for a short wavelength gain band.

FIG. 2 is a graph showing a relationship between the number of channels of an input optical signal and a laser diode control voltage of a first amplification stage when the optical fiber amplifier of FIG. 1 is used for a short wavelength gain band. In this figure, a control voltage "GB1F" is a voltage applied to a laser diode 124 generating forward excitation light in a first amplification stage and another control voltage "GB1B" is a voltage applied to a laser diode 125 generating backward excitation light in the first amplification stage.

Figure 3:
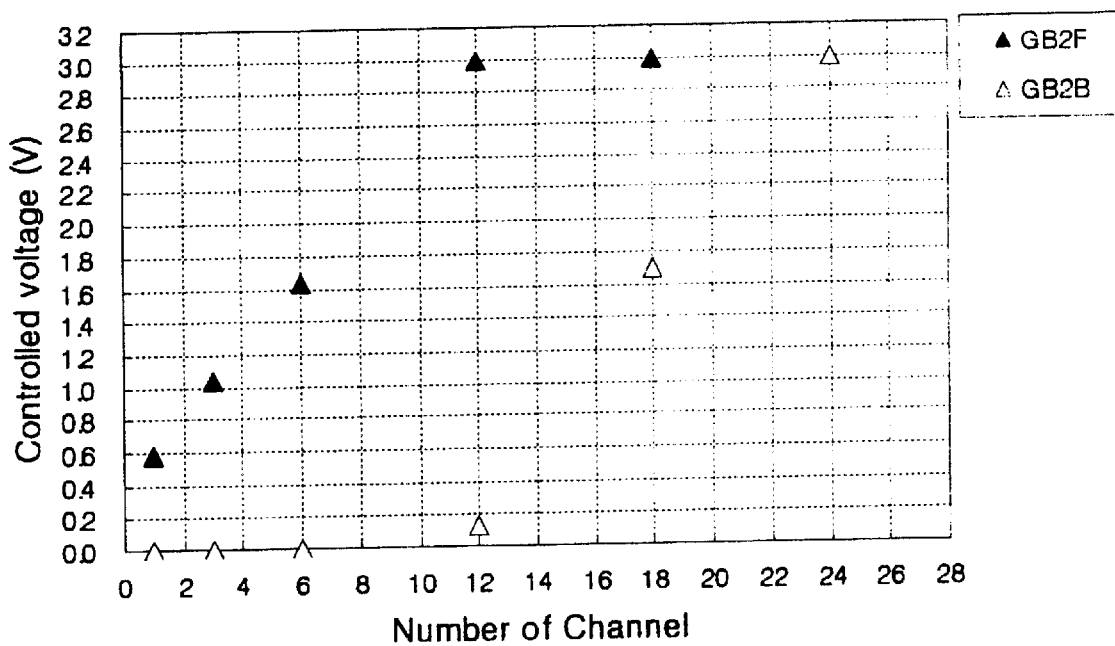
FIG. 3 is a graph showing a relationship between the number of channels of an input optical signal and a laser diode control voltage of a second amplification stage when the optical fiber amplifier of FIG. 1 is used for a short wavelength gain band.

FIG. 3 is a graph showing a relationship between the number of channels of an input optical signal and a laser diode control voltage of a second amplification stage when the optical fiber amplifier of FIG. 1 is used for a short wavelength gain band. In this figure, a control voltage "GB2F" is a voltage applied to a laser diode 154 generating forward excitation light in a second amplification stage and another control voltage "GB2B" is a voltage applied to a laser diode 155 generating backward excitation light in the second amplification stage.

Figure 4:
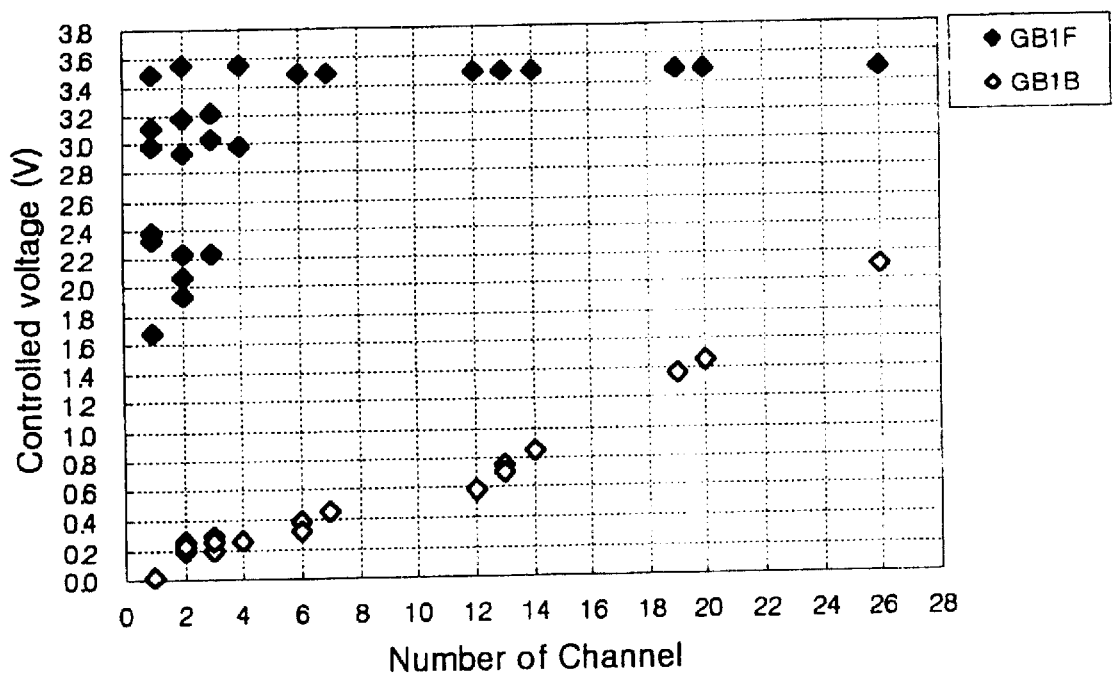
FIG. 4 is a graph showing a relationship between the number of channels of an input optical signal and a laser diode control voltage of a first amplification stage when the optical fiber amplifier of FIG. 1 is used for a long wavelength gain band.

FIG. 4 is a graph showing a relationship between the number of channels of an input optical signal and a laser diode control voltage of a first amplification stage when the optical fiber amplifier of FIG. 1 is used for a long wavelength gain band. In this figure, a control voltage "GB1F" is a voltage applied to a laser diode 124 generating forward excitation light in a first amplification stage and another control voltage "GB1B" is a voltage applied to a laser diode 125 generating backward excitation light in the first amplification stage.

Figure 5:
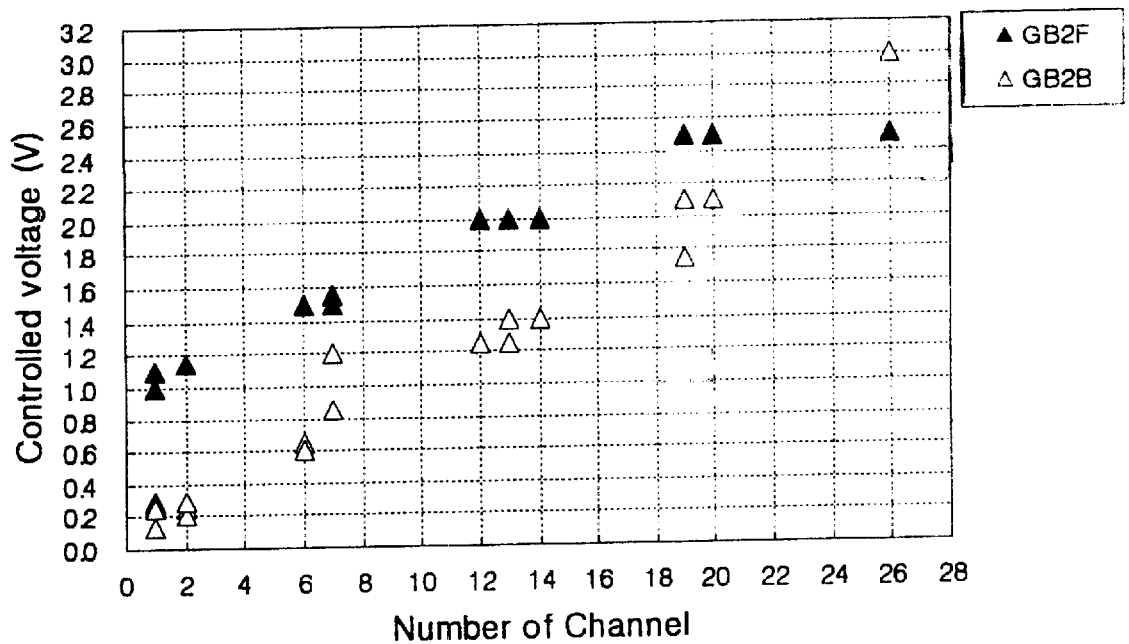
FIG. 5 is a graph showing a relationship between the number of channels of an input optical signal and a laser diode control voltage of a second amplification stage when the optical fiber amplifier of FIG. 1 is used for a long wavelength gain band.

FIG. 5 is a graph showing a relationship between the number of channels of an input optical signal and a laser diode control voltage of a second amplification stage when the optical fiber amplifier of FIG. 1 is used for a long wavelength gain band. In this figure, a control voltage "GB2F" is a voltage applied to a laser diode 154 generating forward excitation light in a second amplification stage and another control voltage "GB2B" is a voltage applied to a laser diode 155 generating backward excitation light in the second amplification stage.

The erbium-doped optical fiber amplifier constructed as shown in FIG. 1 is applicable to both short and long wavelength gain band optical amplifiers, which is enabled by using an erbium-doped optical fiber in which the concentration of erbium ions, are optimized for the length of the optical fiber used in each amplification stage and the gain band characteristics to be used.

The graphs of FIGS. 2 and 4 are similar except that FIG. 2 is applied for a short wavelength gain band (1530–1565 nm) and FIG. 4 is applied for a long wavelength gain band (1570–1605 nm). For reference, the horizontal axes of FIGS. 2 to 5 indicate the number of the surviving channels. Comparing FIGS. 2 and 4 with each other, when a variation of channel occurs outside the fiber amplifier, although the number of the surviving channels shown in FIG. 2 is equal to those in FIG. 4 below a certain surviving channel number, it can be seen that a level of control voltage is dependent upon a wavelength at which a channel is located. In particular, for the control voltage of the laser diode for generating forward excitation light in the first amplification stage, comparing the control voltage "GB1F" of FIG. 2 and that of FIG. 4, it can be seen that the level of control voltage varies greatly according to the wavelengths of the surviving channels below a certain surviving channel number in both short and long wavelength gain band optical amplifiers. For example, when the number of the surviving channels is one in FIG. 2, four types of control voltage "GB1F" is distributed between 0.3 V and 0.6 V and when the number of the surviving channels is four in FIG. 4, six types of the control voltage "GB1F" is distributed between 1.6 V and 3.5 V. In other words, it can be seen that the control voltage of the laser diode for controlling forward excitation light in the first amplification stage is very sensitive to the wavelength of the surviving channel.

On the contrary, the control voltage of the laser diode for controlling backward excitation light in the first amplification stage and the control voltage of the laser diode for controlling forward and backward excitation light in the second amplification stage is not sensitive to the wavelength distribution of the surviving channel when any surviving channel is inputted.

Based on such characteristics of the wavelength distribution of the surviving channel optical signal, for only the control voltage of the laser diode for controlling forward excitation light in the first amplification stage, a transmission filter is provided whose transmittance is adjusted for each wavelength so that the intensity of the optical signal is previously adjusted for each wavelength by the filter. Typically, in order to determine the control voltage of the laser diode, some of input optical signal is branched and a proper control voltage is produced according to the intensity of the branched optical signal. For producing the control voltage of the laser diode for controlling forward excitation light in the first amplification stage in the present invention, the transmission filter having its transmittance for each wavelength adjusted to maintain the control voltage required according to the wavelength of the surviving channel is used. By doing so, a proper control voltage is produced for each wavelength even if the wavelength of the surviving channel is varied while the number of the surviving channels is constant. These results in improvement of the gain inhomogeneity characteristics that the intensity of the optical signal of the surviving channel outputted from the optical amplifier is varied according to the wavelength of the surviving channel. In addition, from the results of "GB1B" shown in FIGS. 2 and 4 and "GB1F" and "GB1B" shown in FIGS. 3 and 4, the control voltages of the laser diode for controlling backward excitation light in the first amplification stage and the laser diode for controlling forward and backward excitation light in the second amplification stage are allowed to have a constant value according to any number of input optical signal, i.e., the intensity of input optical signal, the laser diode controller can be simply constructed.

Next, the erbium-doped fiber amplifier of the present invention will be described with reference to FIG. 6.

Figure 6:
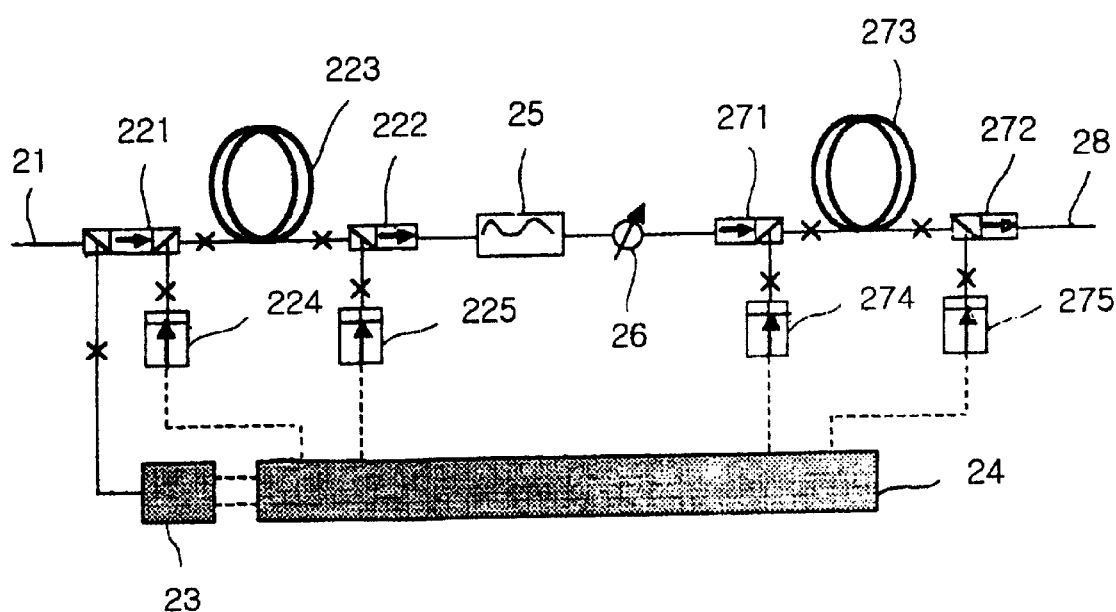
FIG. 6 is a view showing a configuration of the optical fiber amplifier using an input optical signal filtering according to the present invention.

Referring to FIG. 6, the first amplification stage comprises an erbium-doped fiber 223, optical couplers 221 and 222 connected to the front and rear of the erbium-doped fiber 223, and laser diodes 224 and 225 supplying excitation light for the optical couplers 221 and 222. The second amplification stage comprises an erbium-doped fiber 273, optical couplers 271 and 272 connected to the front and rear of the fiber 273, and laser diodes 274 and 275 supplying excitation light for the optical couplers 271 and 272. A gain equalization filter 25 and an optical attenuator 26 sequentially connected between the optical coupler 222 in the first amplification stage and the optical coupler 271 in the second amplification stage have the same function as those shown in FIG. 1.

In FIG. 6, the optical coupler 221 is a TIWDM (Tap/Isolation and Wavelength Division Multiplexing) optical coupler, which branches some of input optical signal and supplies the branched optical signal for an input optical signal detector 23.

Figure 7:
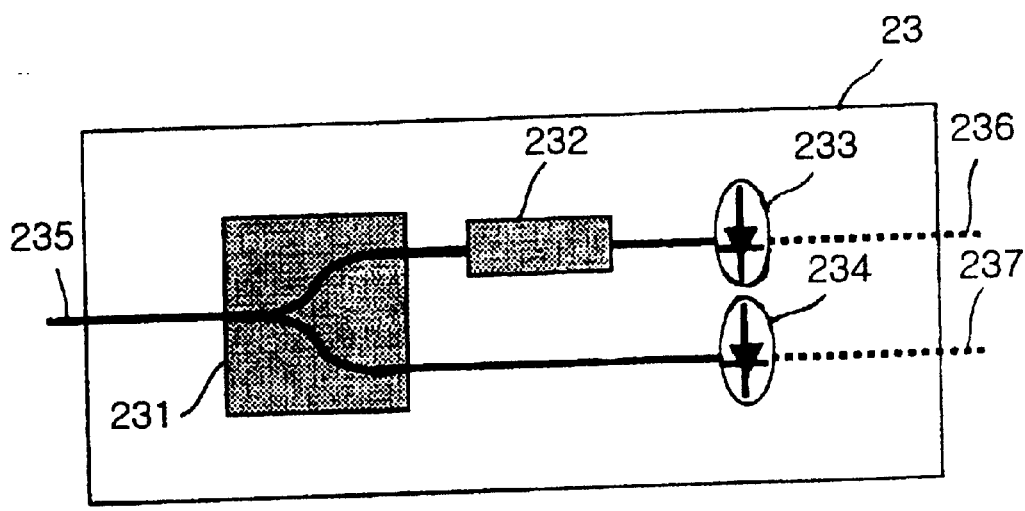
FIG. 7 is a detailed view showing the input optical signal detector of FIG. 6.

FIG. 7 shows a detailed view of the input optical signal detector 23.

Referring to FIG. 7, the input optical signal detector 23 comprises an optical coupler 231 for separating the optical signal inputted via an input port 235 into two signals having a ratio of 50:50, a filter 232 connected to one of output stages of the optical coupler 231, and photo-electric converters 233 and 234 connected to another of output stages of the optical coupler 231 and an output stage of the filter 232, respectively, for converting an optical signal into an electrical signal.

The optical coupler 231 separates the input optical signal branched by the optical coupler 221 shown in FIG. 6 into two signals having a ratio of 50:50. One of the two signals is photo-electrically converted by the photo-electric converter 234. Another of the two signals is filtered by the filter 232. The optical signal filtered by the filter 232 is converted into an electrical signal by the photo-electric converter 233. The electrical signals outputted from the photo-electric converters 233 and 234 are provided to the laser diode controller 24 shown in FIG. 6 via output ports 236 and 237.

Two electrical signals obtained in the input optical signal detector 23 are provided to the laser diode controller 24 which generates the control voltage of the laser diode 224 for generating forward excitation light in the first amplification stage using one electrical signal obtained through the filter 232 and the control voltages of other laser diodes 225, 274 and 275 using another electrical signal obtained without the filter 232.

Figure 8:
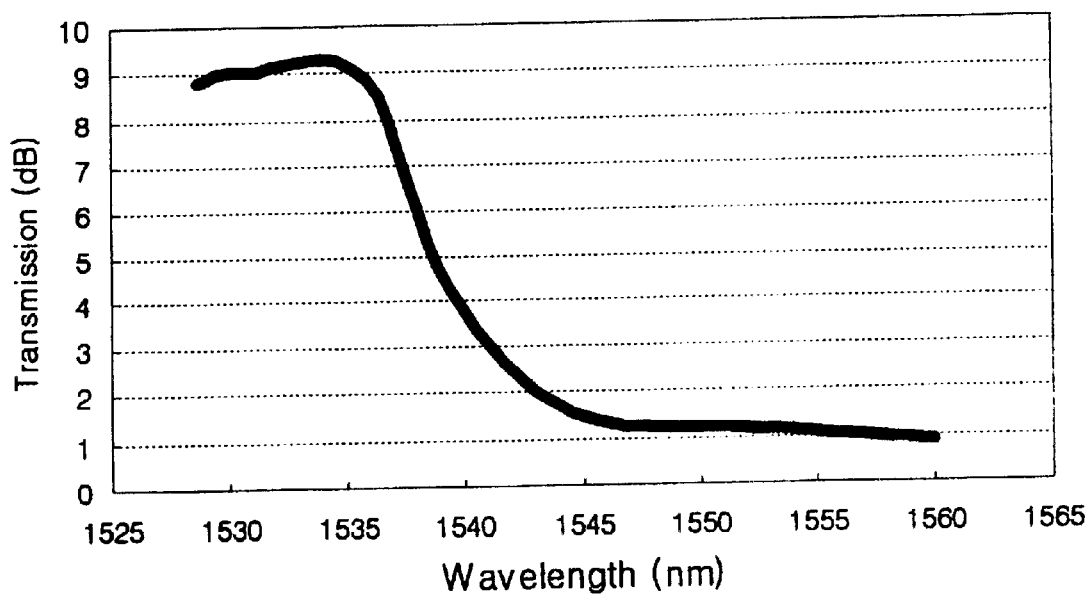
FIG. 8 is a graph showing the spectrum characteristics of the filter shown in FIG. 7 when the optical fiber amplifier of the present invention is used for a short wavelength gain band.
Figure 9:
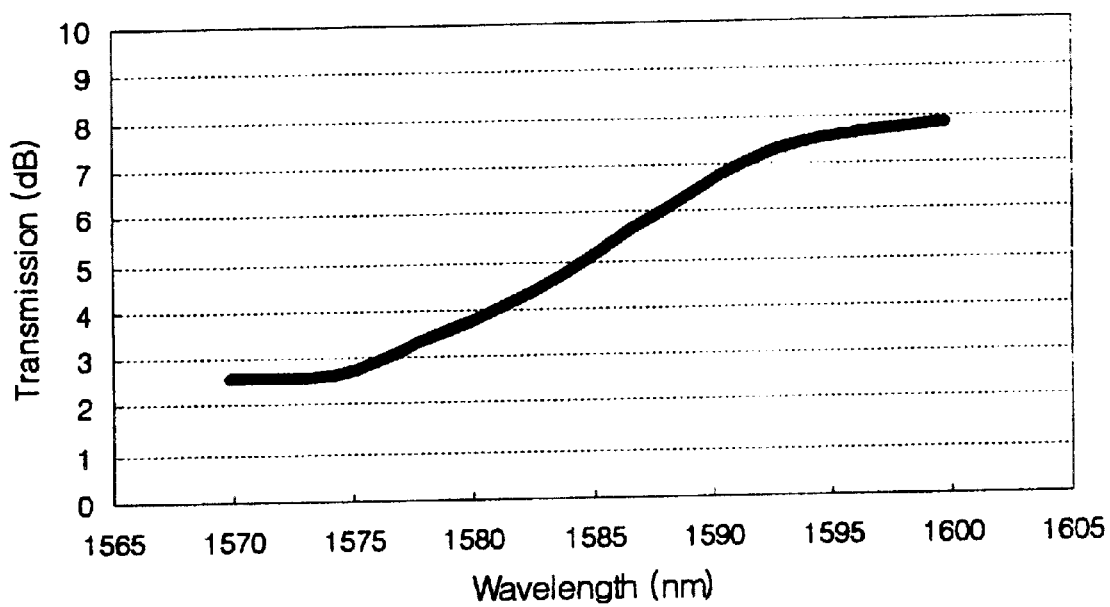
FIG. 9 is a graph showing the spectrum characteristics of the filter shown in FIG. 7 when the optical fiber amplifier of the present invention is used for a long wavelength gain band.

FIGS. 8 and 9 shows spectrum characteristics of the filter 232, FIG. 8 used when the optical fiber amplifier of the present invention is used for a short wavelength gain band and FIG. 9 used when the optical fiber amplifier of the present invention is used for a long wavelength gain band. Referring to FIG. 8, a transmittance is high below a certain wavelength but low above the certain wavelength in the short wavelength gain band. Referring to FIG. 9, the transmittance is linear with respect to wavelength in the long wavelength gain band. According to such spectrum characteristics, the transmittance can be controlled to be increased by the filter for the wavelength at which the control voltage of the laser diode should be high and decreased for the wavelength at which the control voltage should be low.

Therefore, the laser diode controller 24 produces the control voltage for driving the laser diode 224 of the first amplification stage very sensitive to the gain inhomogeneity characteristics of the surviving channel using the electrical signal passing through the filter 232 and the control voltages for driving other laser diodes 225, 274 and 275 not sensitive to the gain inhomogeneity characteristics of the surviving channel using the electrical signal not passing through the filter 23. Here, the control voltages for driving other laser diodes 225, 274 and 275 use any constant voltage value. Therefore, since the laser diodes can be controlled without a separate calculation of gain even if an optical signal survives in any wavelength, the laser diode controller 24 can be simply constructed.

As described above, in accordance with the present invention, a variation of the intensity of the output optical signal in the optical fiber amplifier, which results from an gain imbalance due to different wavelength distribution caused by the gain inhomogeneity characteristics, can be prevented by examining the laser diode sensitive to the gain inhomogeneity characteristics in the erbium-doped optical fiber amplifier, constructing the filter having spectrum characteristics capable of suppressing the gain imbalance of the optical signal outputted from the optical fiber amplifier, and driving the sensitive laser diode using the electrical signal obtained by branching some of the input optical signal and passing the branched optical signal through the filter and driving other laser diodes with a constant voltage value.

Since the optical fiber amplifier according to the present invention improves the gain control response time by simplifying the laser diode controller required for a high speed gain control over a control method by which an certain amount of population inversion is calculated according to the prior excitation light control method, the efficiency and performance of optical signal transmission through the optical fiber amplifier can be maximized.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An erbium-doped optical fiber amplifier using input optical signal filtering, comprising:

a first amplification stage for receiving an input optical signal and first forward and backward excitation light, and amplifying the input optical signal using energy released when erbium ions excited by the excitation light return to their original energy level;

a pre-processing means for performing a gain equalization process and a light intensity attenuating process for the signal amplified in said first amplification stage;

a second amplification stage for receiving the optical signal processed in said pre-processing means and second forward and backward excitation light and performing a second amplification operation;

a plurality of laser diodes for generating the first and second forward and backward excitation light and providing the first and second forward and backward excitation light to said first and second amplification stages, respectively;

an input optical signal detector for branching and receiving some of the input optical signal, separating the received optical signal into two signals having a ratio of 50:50, and photo-electrically converting a first one of the separated optical signals by performing a filtering process for compensating for the gain inhomogeneity characteristics of the fiber, and a second one without any filtering; and a laser diode controller for generating forward diode control voltage of said first amplification stage using the filtered signal of the electrical signals provided by said input optical signal detector and generating other laser diode control voltage using the signal that is not filtered.

2. The amplifier according to claim 1, wherein said first amplification stage comprises:

a first erbium-doped optical fiber for receiving the input optical signal and the first forward and backward excitation light and performing an amplification operation, a first optical coupler for branching some of the input optical signal to be provided for said input optical signal detector and providing the first forward excitation light and the input optical signal for said first erbium-doped optical fiber, and a second optical coupler for providing the first backward excitation light for said first erbium-doped optical fiber and outputting a signal amplified in said first erbium-doped optical fiber; and said second amplification stage comprises, a second erbium-doped optical fiber for receiving the optical signal processed in said pre-processing means and the second forward and backward excitation light and performing an amplification operation, a third optical coupler for transmitting the optical signal in processed in said pre-processing means to said second erbium-doped optical fiber and providing the second forward excitation light for said second erbium-doped optical fiber, and a fourth optical coupler for providing the second backward excitation light for said second erbium-doped optical fiber and outputting a signal amplified in said second erbium-doped optical fiber.

3. The amplifier according to claim 2, wherein said first optical coupler is a TIWDM (Tap/Isolation and Wavelength Division Multiplexing) optical coupler.

4. The amplifier according to claim 1, wherein said pre-processing means comprises:

a gain equalization filter for balancing total gain by extracting a smooth portion of the gain of the optical signal amplified in said first amplification stage; and an optical attenuator for optimizing the optical signal by adjusting previously the intensity of the optical signal inputted to said second amplification stage.

5. The amplifier according to claim 1, wherein said input optical signal detector comprises:

an optical coupler for separating some of the optical signal branched from the input optical signal into two optical signals having a ratio of 50:50 and outputting the two optical signals;

a filter for receiving one of the two optical signals and compensating for the gain inhomogeneity characteristics; and a plurality of photo-electric converters for receiving the second one of the two optical signals from said optical coupler and an output optical signal from said filter and converting the received optical signals into electrical signals.

6. The amplifier according to claim 5, wherein said filter has spectrum characteristics that a transmittance is high below a certain wavelength but low above the certain wavelength in a short wavelength gain band and the transmittance is linear with respect to wavelengths in a long wavelength gain band.

* * * * *